(12) United States Patent
Narayana et al.

(10) Patent No.: US 8,830,617 B1
(45) Date of Patent: Sep. 9, 2014

(54) DISK DRIVE ADJUSTING STATE ESTIMATOR TO COMPENSATE FOR UNRELIABLE SERVO DATA

(71) Applicant: Western Digital Technologies, Inc., Irvine, CA (US)

(72) Inventors: Aswartha Narayana, Aliso Viejo, CA (US); Yanan Huang, Torrance, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/925,798

(22) Filed: Jun. 24, 2013

Related U.S. Application Data

(60) Provisional application No. 61/829,108, filed on May 30, 2013.

(51) Int. Cl.
*G11B 5/55* (2006.01)

(52) U.S. Cl.
USPC ............... 360/55; 360/78.14; 360/78.09

(58) Field of Classification Search
None
See application file for complete search history.

(56) References Cited

U.S. PATENT DOCUMENTS

| | | | |
|---|---|---|---|
| 4,535,372 A | 8/1985 | Yeakley | |
| 4,638,384 A | 1/1987 | Stewart et al. | |
| 4,679,103 A * | 7/1987 | Workman | 360/78.14 |
| 5,254,920 A | 10/1993 | Agarwal et al. | |
| 5,305,158 A | 4/1994 | Ueda et al. | |
| 5,319,509 A | 6/1994 | Michelson et al. | |
| 5,336,942 A | 8/1994 | Khayat | |
| 5,471,353 A | 11/1995 | Codilian et al. | |
| 5,510,939 A | 4/1996 | Lewis | |
| 5,602,689 A | 2/1997 | Kadlec et al. | |
| 5,638,230 A | 6/1997 | Kadlec | |
| 5,646,797 A | 7/1997 | Kadlec et al. | |
| 5,650,886 A | 7/1997 | Codilian et al. | |
| 5,654,840 A | 8/1997 | Patton et al. | |
| 5,675,450 A | 10/1997 | Kadlec | |
| 5,677,809 A | 10/1997 | Kadlec | |
| 5,680,272 A | 10/1997 | Kadlec et al. | |
| 5,682,334 A | 10/1997 | Plutowski et al. | |
| 5,684,650 A | 11/1997 | Kadlec et al. | |
| 5,754,358 A * | 5/1998 | Yatsu | 360/78.09 |
| 5,760,563 A | 6/1998 | Bennett et al. | |
| 5,768,045 A | 6/1998 | Patton, III et al. | |
| 5,793,558 A | 8/1998 | Codilian et al. | |
| 5,796,542 A | 8/1998 | Szeremeta | |
| 5,808,440 A | 9/1998 | Bennett et al. | |
| 5,821,715 A | 10/1998 | Plutowski et al. | |
| 5,825,708 A | 10/1998 | Bennett | |
| 5,889,629 A | 3/1999 | Patton, III | |
| 5,898,283 A | 4/1999 | Bennett | |
| 5,898,286 A | 4/1999 | Clare et al. | |
| 5,914,829 A | 6/1999 | Kadlec et al. | |
| 5,914,830 A | 6/1999 | Kadlec et al. | |

(Continued)

*Primary Examiner* — Wayne Young
*Assistant Examiner* — James L Habermehl

(57) ABSTRACT

A disk drive is disclosed comprising a disk comprising tracks defined by servo sectors, a head, and control circuitry comprising a servo control system operable to actuate the head over the disk based on the servo sectors. An estimated acceleration EstAccel of the head over the disk is generated based on at least one of the servo sectors. When the EstAccel is determined to be reliable, an estimated velocity EstVel of the head over the disk is generated based on the EstAccel. When the EstAccel is determined to be unreliable, the EstAccel is adjusted to generate an adjusted acceleration AdjAccel and the EstVel of the head over the disk is generated based on the AdjAccel.

20 Claims, 5 Drawing Sheets

(56) References Cited

U.S. PATENT DOCUMENTS

| | | |
|---|---|---|
| 5,940,240 A | 8/1999 | Kupferman |
| 5,946,157 A | 8/1999 | Codilian et al. |
| 5,946,158 A | 8/1999 | Nazarian et al. |
| 5,965,992 A | 10/1999 | Goretzki et al. |
| 5,982,173 A | 11/1999 | Hagen |
| 5,995,316 A | 11/1999 | Stich |
| 6,014,283 A | 1/2000 | Codilian et al. |
| 6,031,684 A * | 2/2000 | Gregg ............... 360/78.09 |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,114,670 A | 9/2000 | Erickson et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,388,829 B1 | 5/2002 | Nazarian |
| 6,462,896 B1 | 10/2002 | Codilian et al. |
| 6,476,996 B1 | 11/2002 | Ryan |
| 6,484,577 B1 | 11/2002 | Bennett |
| 6,490,120 B1 * | 12/2002 | Burton et al. ............... 360/78.09 |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,574,070 B2 * | 6/2003 | Gregg ............... 360/78.09 |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,657,811 B1 | 12/2003 | Codilian |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,762,902 B2 * | 7/2004 | Chew ............... 360/78.04 |
| 6,775,081 B2 * | 8/2004 | Ottesen et al. ............... 360/48 |
| 6,781,787 B1 | 8/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,831,808 B2 * | 12/2004 | Ottesen et al. ............... 360/78.06 |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,168 B1 * | 4/2005 | Luo et al. ............... 318/560 |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,274 B2 * | 9/2005 | Inaji et al. ............... 360/78.14 |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,982,848 B2 * | 1/2006 | Inaji et al. ............... 360/78.04 |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,064,919 B2 * | 6/2006 | Inaji et al. ............... 360/78.06 |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |

(56) References Cited

U.S. PATENT DOCUMENTS

| | | |
|---|---|---|
| 7,126,781 B1 | 10/2006 | Bennett |
| 7,158,329 B1 | 1/2007 | Ryan |
| 7,177,106 B2 * | 2/2007 | Inaji et al. ............... 360/60 |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,203,028 B2 * | 4/2007 | Chung et al. ............ 360/78.09 |
| 7,206,162 B2 | 4/2007 | Semba et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,543 B1 * | 5/2007 | Abrishamchian et al. ...... 360/60 |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,271,972 B1 | 9/2007 | Pham et al. |
| 7,289,288 B1 | 10/2007 | Tu |
| 7,295,397 B1 | 11/2007 | Chang |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,342,737 B2 | 3/2008 | DeRosa et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,499,239 B2 | 3/2009 | Chang |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,953 B1 | 9/2009 | Cerda et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,596 B2 | 11/2010 | Shen et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,957,090 B2 * | 6/2011 | Ishihara et al. ............ 360/78.07 |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |

(56) References Cited

U.S. PATENT DOCUMENTS

| | | |
|---|---|---|
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 2003/0147172 A1 | 8/2003 | Singer et al. |
| 2009/0296263 A1* | 12/2009 | Kida et al. .............. 360/75 |

* cited by examiner

DISK DRIVE ADJUSTING STATE ESTIMATOR TO COMPENSATE FOR UNRELIABLE SERVO DATA

CROSS-REFERENCE TO RELATED APPLICATIONS

This application claims priority to provisional U.S. Patent Application Ser. No. 61/829,108, filed on May 30, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

DETAILED DESCRIPTION

Figure 1:
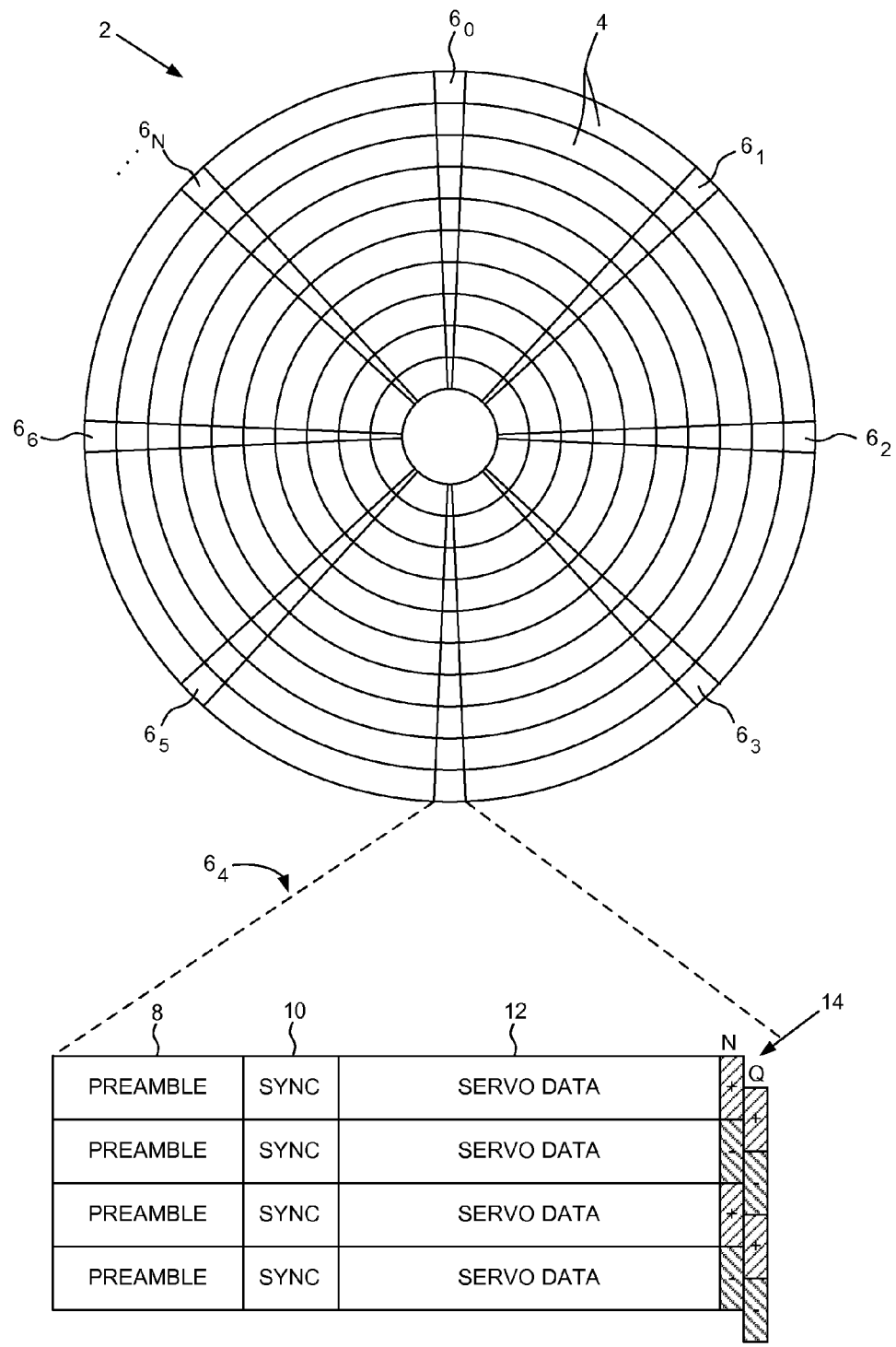
FIG. 1 shows a prior art disk format comprising a plurality of servo tracks defined by servo sectors.
Figure 2A:
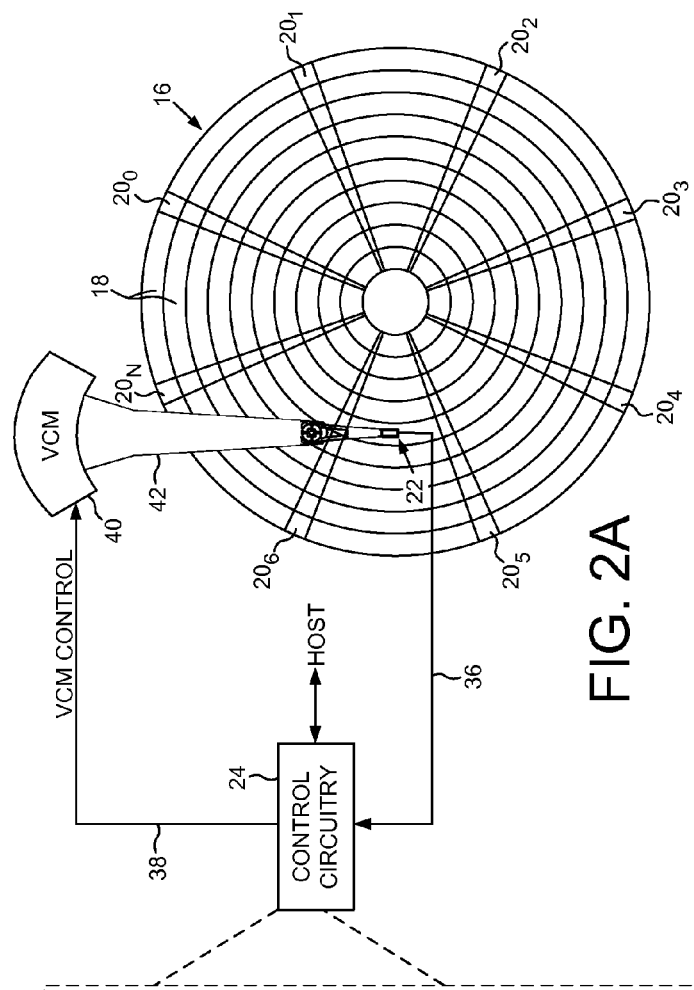
FIG. 2A shows a disk drive comprising a head actuated over a disk by control circuitry comprising a servo control system.
Figure 2B:
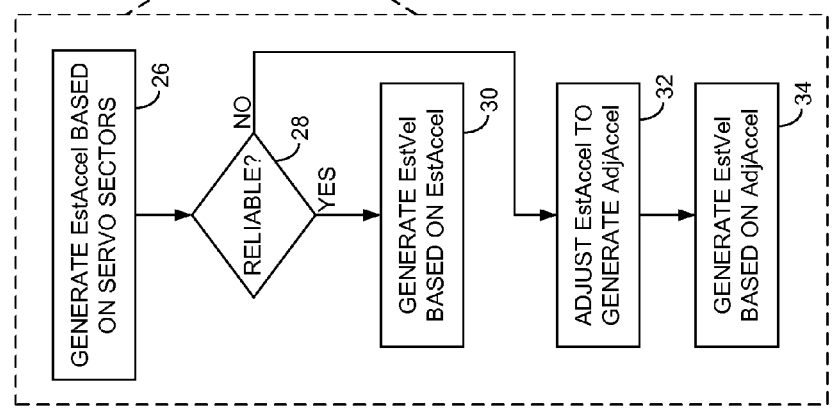
FIG. 2B is a flow diagram according to an embodiment wherein when an estimated acceleration (EstAccel) of the head based on the servo sectors is unreliable, the EstAccel is adjusted in order to generate an estimated velocity (EstVel).

FIG. 2A shows a disk drive according to an embodiment comprising a disk 16 comprising tracks 18 defined by servo sectors $20_0$-$20_N$, a head 22, and control circuitry 24 comprising a servo control system operable to actuate the head 22 over the disk 16 based on the servo sectors $20_0$-$20_N$. The control circuitry 24 is operable to execute the flow diagram of FIG. 2B, wherein an estimated acceleration EstAccel of the head over the disk is generated based on at least one of the servo sectors (block 26). Whether the EstAccel is unreliable due to an unreliable servo sector is determined. When the EstAccel is determined to be reliable (block 28), an estimated velocity EstVel of the head over the disk is determined based on the EstAccel (block 30). When the EstAccel is determined to be unreliable (block 28), the EstAccel is adjusted to generate an adjusted acceleration AdjAccel (block 32) and the EstVel of the head over the disk is generated based on the AdjAccel (block 34).

In the embodiment of FIG. 2A, the control circuitry 24 processes a read signal 36 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 38 applied to a voice coil motor (VCM) 40 which rotates an actuator arm 42 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, when the control circuitry 24 seeks the head 22 across the disk 16 to access a target track, a velocity of the head 22 is estimated based on the servo sectors $20_0$-$20_N$. The estimated velocity (EstVel) may be compared to a target velocity of a velocity profile to generate a state error, and the state error may be processed using a suitable compensator to generate the control signal 38 applied to the VCM 40. In one embodiment, the EstVel may be generated based on an estimated acceleration (EstAccel) of the head, where the EstAccel of the head may be generated based on position measurements taken when reading the servo sectors during a seek operation. For example, the EstAccel may be generated based on:

$$\text{EstAccel}[k] = \text{Pos}[k] - 2\text{Pos}[k-1] + \text{Pos}[k-2]$$

where Pos[k] represents a position of the head at servo sector k as determined from reading servo sector k. However, a defect in a servo sector may result in an error in the position measurement Pos[k], and a corresponding error in the EstAccel. In one embodiment, a defect in a servo sector may render the servo sector unrecoverable, in which case the corresponding Pos[k] may be generated by a state estimator. Accordingly, an unreliable servo sector may be a recoverable servo sector that generates a noisy Pos[k] measurement, or an unreliable servo sector may be an unrecoverable servo sector.

In one embodiment, the EstAccel may be determined to be unreliable due to an unreliable servo sector by detecting when the change in the EstAccel exceeds a threshold. That is, if the difference between a current EstAccel and a previous EstAccel exceeds a threshold X1, it is determined that the current EstAccel is likely unreliable. In one embodiment, the threshold X1 is selected based on a known acceleration limit of the VCM 40. That is, if the EstAccel changes by an amount that is near the acceleration limit of the VCM 40, then the current EstAccel is determined to be unreliable. In one embodiment, when the current EstAccel is determined to be unreliable, a weighting of the current EstAccel is reduced when computing the EstVel.

Figure 3:
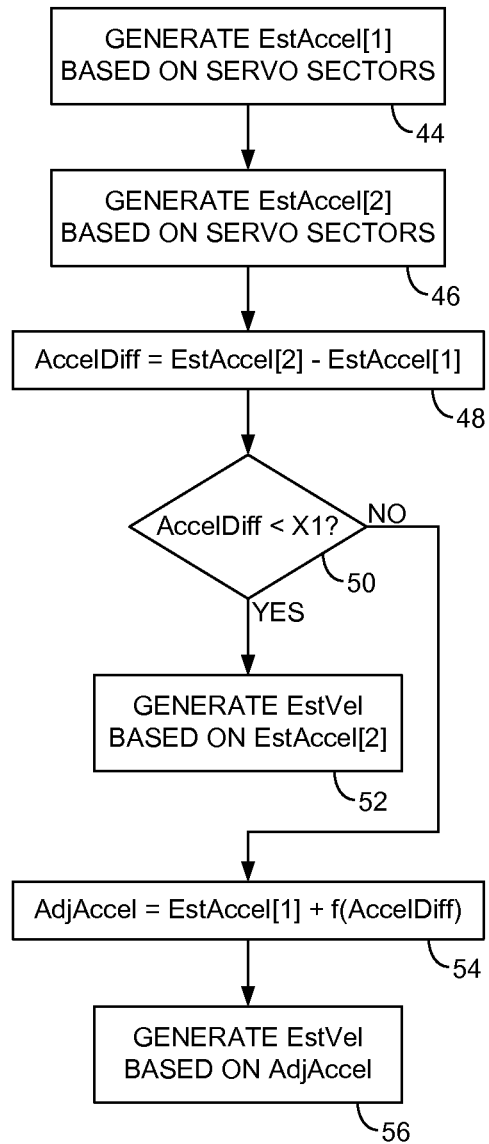
FIG. 3 is a flow diagram wherein when a current EstAccel is determined to be unreliable, a weighting of the current EstAccel is reduced when computing the EstVel.

This embodiment is understood with reference to the flow diagram of FIG. 3, wherein an EstAccel[1] is generated based on the servo sectors (block 44), such as using the above equation. An EstAccel[2] is then generated at the next servo sector (block 46), and a difference AccelDiff between the EstAccel[1] and EstAccel[2] is generated (block 48). When the AccelDiff does not exceed a threshold X1 (block 50), the EstVel is updated (block 52) based on the EstAccel[2]. When the AccelDiff exceeds the threshold X1 (block 50), the AdjAccel is generated based on EstAccel[1] plus a function of AccelDiff (block 54), where the function reduces a weighting of EstAccel[2] when updating EstVel based on the AdjAccel (block 56).

Figure 4A:
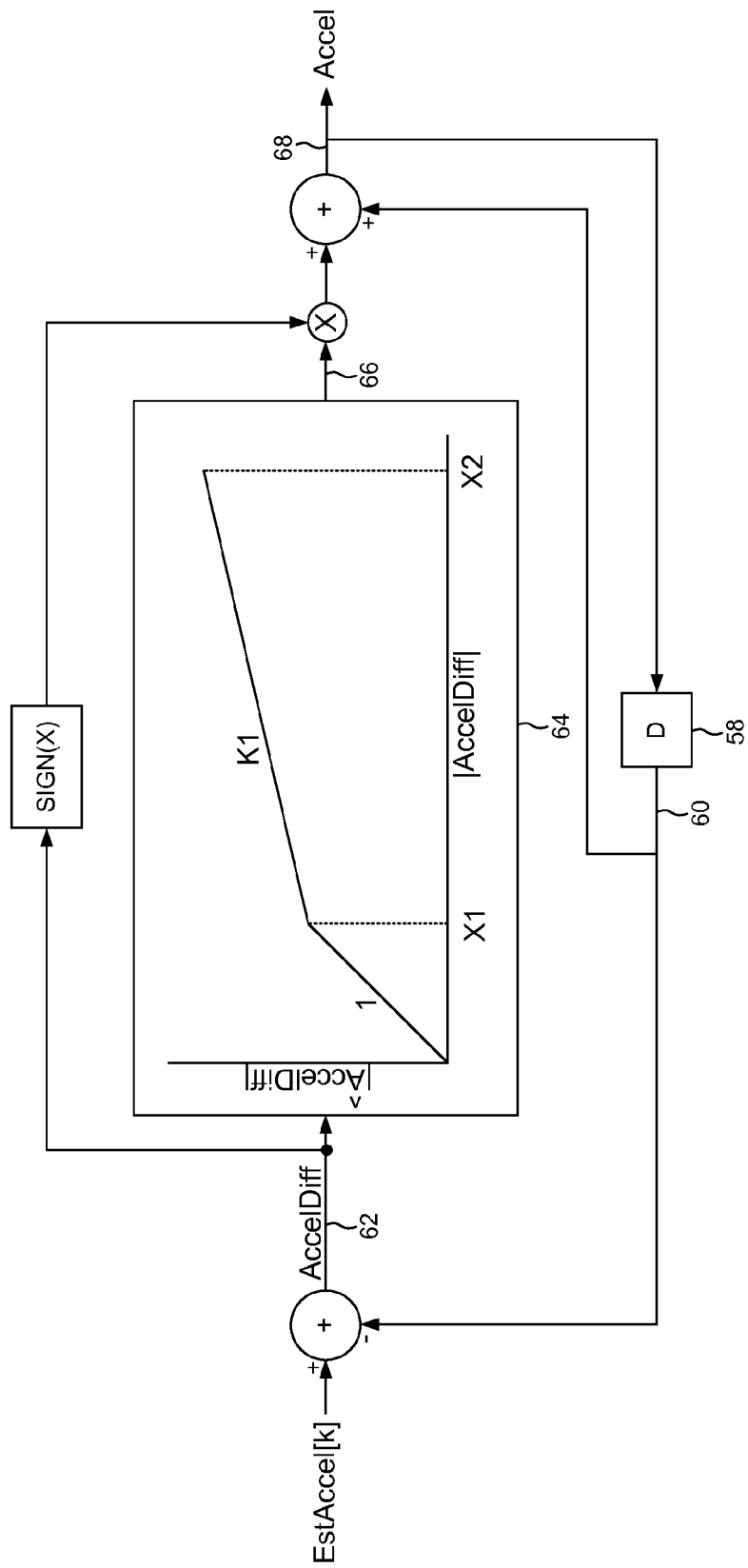
FIG. 4A shows an embodiment for adjusting the EstAccel based on a deviation in magnitude of the EstAccel.

Any suitable function of AccelDiff may be employed at block 54 of FIG. 3 in order to reduce the weighting of EstAccel[2] when computing the AdjAccel used to update the EstVel. FIG. 4A illustrates an example function according to an embodiment, wherein a delay element 58 stores a previous acceleration estimate 60 which is subtracted from a current acceleration estimate EstAccel[k] to generate the AccelDiff 62. Block 64 implements a non-linear function of AccelDiff 62, and when AccelDiff is less than threshold X1, the output 66 of block 64 equals AccelDiff 62 so that an Accel signal 68 is generated as EstAccel[2]. When AccelDiff exceeds the threshold X1, a weighting factor K1 scales the AccelDiff in order to reduce the weighting of EstAccel[2] when generating the Accel signal 68 based on:

$$\text{Accel}[k]=\text{EstAccel}[k-1]+\text{sign}(\text{AccelDiff})\cdot(X1+((\text{abs}(\text{AccelDiff})-X1)\cdot K1)).$$

Any suitable weighting factor K1 may be employed to reduce the weighting of the current EstAccel[k] when updating the EstVel, wherein in one embodiment the weighting factor K1 is selected to maintain adequate seek performance without losing stability while gliding through one or more defective servo sectors.

Figure 4B:
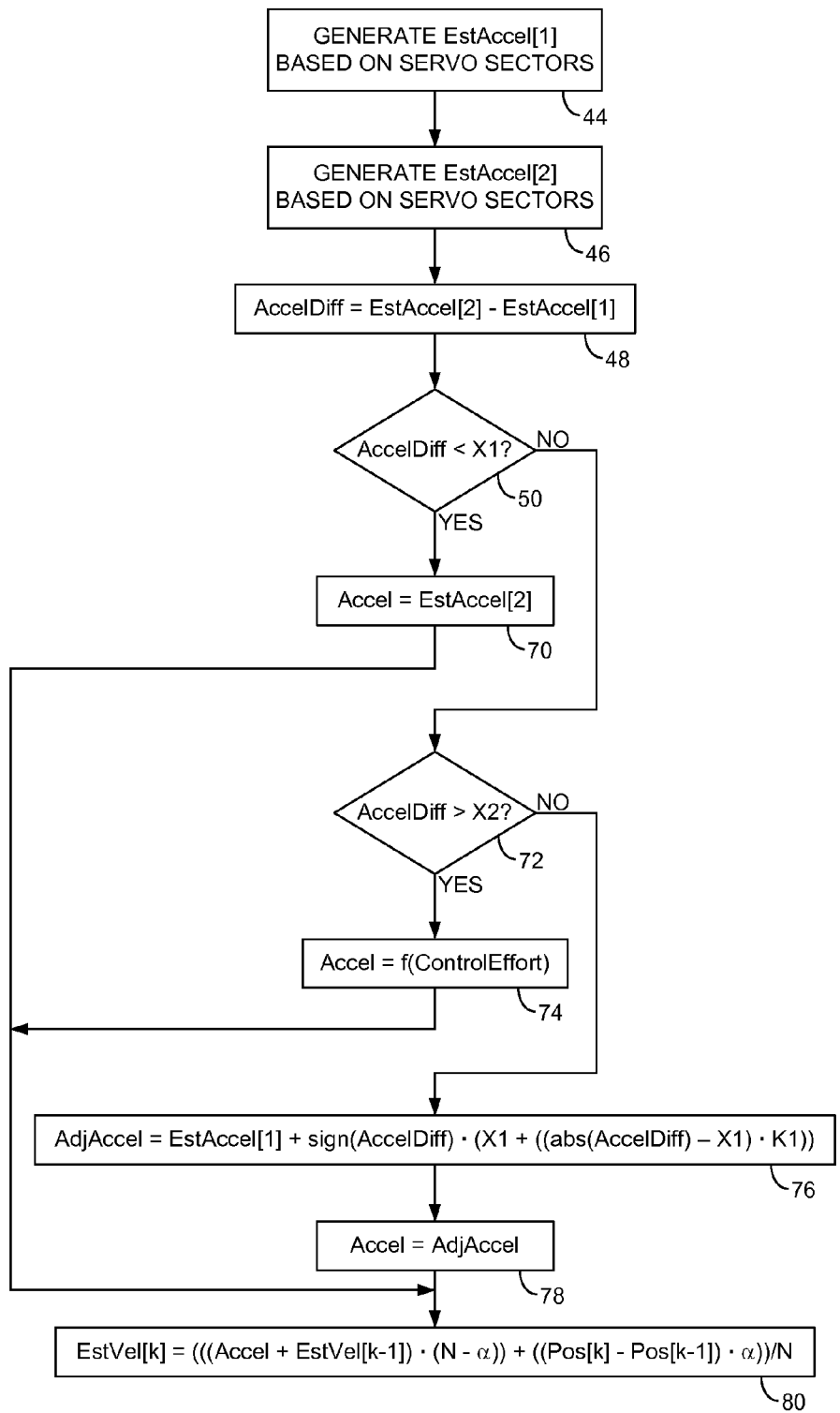
FIG. 4B is a flow diagram according to an embodiment wherein when the EstAccel is unreliable, the current and subsequent values of the EstAccel are weighted to generate the EstVel.

FIG. 4B is a flow diagram according to an embodiment that expands on the flow diagram of FIG. 3, wherein when the AccelDiff is less than the threshold X1 (block 50), the Accel signal 68 (FIG. 4A) is generated as EstAccel[2] (block 70). When the AccelDiff is greater than a second threshold X2 (block 72) as shown in FIG. 4A, it is assumed that EstAccel[2] is completely unreliable and therefor the Accel signal 68 is generated as a function of the control signal 38 applied to the VCM 40 (block 74). For example, the acceleration of the VCM 40 may be estimated based on the control signal 38 and a predetermined nominal response of the VCM 40 to the control signal 38 based on nominal design parameters, such as the torque constant of the VCM 40. When the AccelDiff is between the threshold X1 and the threshold X2 shown in FIG. 4A, the AdjAccel is generated based on the above equation (block 76), and the Accel signal 68 is assigned to the AdjAccel (block 78). The EstVel of the head over the disk is then generated (block 80) based on:

$$\text{EstVel}[k]=(((\text{Accel}+\text{EstVel}[k-1])\cdot(N-\alpha))+((\text{Pos}[k]-\text{Pos}[k-1])\cdot\alpha))/N$$

where N is a constant integer, α is a variable integer, Pos[k−1] represents a position of the head at servo sector k−1 as determined from reading servo sector k−1, and Pos[k] represents a position of the head at servo sector k as determined from reading servo sector k.

In one embodiment, when the estimated acceleration of the head over the disk is changing slowly such that the AccelDiff is less than the threshold X1 in FIG. 4A, the variable integer α is incremented until reaching N. For example, in one embodiment N=4 such that when AccelDiff is less than the threshold X1 for more than four consecutive servo sectors, the EstVel is generated in the above equation based only on Pos[k]−Pos[k−1]. That is, when the estimated acceleration is changing slowly, the EstVel may be generated reliably as the change in position of the head over time. When AccelDiff is greater than the threshold X1, the variable integer α is reset to zero so that the EstVel is generated in the above equation based only on Accel+EstVel[k−1]. When AccelDiff falls back below the threshold X1, the variable integer α is incremented at each servo sector such that the EstVel is generated based both on the Accel signal 68 as well as Pos[k]−Pos[k−1], with more weight given to Pos[k]−Pos[k−1] at each new servo sector until α=4.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk comprising tracks defined by servo sectors;
   a head; and
   control circuitry comprising a servo control system operable to actuate the head over the disk based on the servo sectors, the control circuitry operable to:
   generate an estimated acceleration EstAccel of the head over the disk based on at least one of the servo sectors;
   determine whether the EstAccel is unreliable due to an unreliable servo sector;
   when the EstAccel is determined to be reliable, generate an estimated velocity EstVel of the head over the disk based on the EstAccel; and
   when the EstAccel is determined to be unreliable, adjust the EstAccel to generate an adjusted acceleration AdjAccel and generate the EstVel of the head over the disk based on the AdjAccel.

2. The disk drive as recited in claim 1, wherein the control circuitry is further operable to:
   generate an estimated acceleration EstAccel[1] of the head over the disk at a first servo sector;
   generate an estimated acceleration EstAccel[2] of the head over the disk at a second servo sector; and
   determine that the EstAccel[2] is unreliable when a difference AccelDiff between the EstAccel[1] and EstAccel[2] exceeds a threshold X1.

3. The disk drive as recited in claim 2, wherein the control circuitry is further operable to generate the AdjAccel based on the AccelDiff.

4. The disk drive as recited in claim 3, wherein the control circuitry is further operable to generate the AdjAccel based on:

$$AdjAccel=EstAccel[1]+f(AccelDiff).$$

5. The disk drive as recited in claim 4, wherein the control circuitry is further operable to generate the AdjAccel based on:

$$AdjAccel=EstAccel[1]+sign(AccelDiff)\cdot(X1+((abs(AccelDiff)-X1)\cdot K1))$$

where K1 is a weighting factor that reduces a weighting of EstAccel[2] when generating the EstVel.

6. The disk drive as recited in claim 5, wherein the control circuitry is further operable to generate the EstVel based on:

$$EstVel[k]=(((Accel+EstVel[k-1])\cdot(N-\alpha))+((Pos[k]-Pos[k-1])\cdot\alpha))/N$$

where:
Accel equals EstAccel[2] when EstAccel[2] is reliable;
Accel equals AdjAccel when EstAccel[2] is unreliable;
N is a constant integer;
$\alpha$ is a variable integer;
Pos[k-1] represents a position of the head at servo sector k-1 as determined from reading servo sector k-1; and
Pos[k] represents a position of the head at servo sector k as determined from reading servo sector k.

7. The disk drive as recited in claim 6, wherein the control circuitry is further operable to increment $\alpha$ when AccelDiff is less than X1.

8. The disk drive as recited in claim 7, wherein the control circuitry is further operable to reset $\alpha$ to zero when AccelDiff is greater than X1.

9. The disk drive as recited in claim 6, wherein the control circuitry is further operable to generate EstAccel[2] based on:

$$EstAccel[2]=Pos[k]-2\cdot Pos[k-1]+Pos[k-2]$$

where Pos[k-2] represents a position of the head at servo sector k-2 as determined from reading servo sector k-2.

10. The disk drive as recited in claim 2, wherein when AccelDiff exceeds a threshold X2, the control circuitry is further operable to generate the EstVel based on a control effort applied to an actuator operable to actuate the head over the disk.

11. A method of operating a disk drive comprising a disk comprising tracks defined by servo sectors, a head, and control circuitry comprising a servo control system operable to actuate the head over the disk based on the servo sectors, the method comprising:
    generating an estimated acceleration EstAccel of the head over the disk based on at least one of the servo sectors;
    determining whether the EstAccel is unreliable due to an unreliable servo sector;
    when the EstAccel is determined to be reliable, generating an estimated velocity EstVel of the head over the disk based on the EstAccel; and
    when the EstAccel is determined to be unreliable, adjusting the EstAccel to generate an adjusted acceleration AdjAccel and generating the EstVel of the head over the disk based on the AdjAccel.

12. The method as recited in claim 11, further comprising:
    generating an estimated acceleration EstAccel[1] of the head over the disk at a first servo sector;
    generating an estimated acceleration EstAccel[2] of the head over the disk at a second servo sector; and
    determining that the EstAccel[2] is unreliable when a difference AccelDiff between the EstAccel[1] and EstAccel[2] exceeds a threshold X1.

13. The method as recited in claim 12, further comprising generating the AdjAccel based on the AccelDiff.

14. The method as recited in claim 13, further comprising generating the AdjAccel based on:

$$AdjAccel=EstAccel[1]+f(AccelDiff).$$

15. The method as recited in claim 14, further comprising generating the AdjAccel based on:

$$AdjAccel=EstAccel[1]+sign(AccelDiff)\cdot(X1+((abs(AccelDiff)-X1)\cdot K1))$$

where K1 is a weighting factor that reduces a weighting of EstAccel[2] when generating the EstVel.

16. The method as recited in claim 15, further comprising generating the EstVel based on:

$$EstVel[k]=(((Accel+EstVel[k-1])\cdot(N-\alpha))+((Pos[k]-Pos[k-1])\cdot\alpha))/N$$

where:
Accel equals EstAccel[2] when EstAccel[2] is reliable;
Accel equals AdjAccel when EstAccel[2] is unreliable;
N is a constant integer;
$\alpha$ is a variable integer;
Pos[k-1] represents a position of the head at servo sector k-1 as determined from reading servo sector k-1; and
Pos[k] represents a position of the head at servo sector k as determined from reading servo sector k.

17. The method as recited in claim 16, further comprising incrementing a when AccelDiff is less than X1.

18. The method as recited in claim 17, further comprising resetting a to zero when AccelDiff is greater than X1.

19. The method as recited in claim 16, further comprising generating EstAccel[2] based on:

$$EstAccel[2]=Pos[k]-2\cdot Pos[k-1]+Pos[k-2]$$

where Pos[k−2] represents a position of the head at servo sector k−2 as determined from reading servo sector k−2.

20. The method as recited in claim 12, wherein when AccelDiff exceeds a threshold X2, the control circuitry is further operable to generate the EstVel based on a control effort applied to an actuator operable to actuate the head over the disk.

* * * * *